United States Patent Office 3,008,953
Patented Nov. 14, 1961

3,008,953
METHOD OF PREPARING DICARBOXYLIC ACID ESTERS OF ETHYL CELLULOSE
Carlton L. Crane, Rochester, N.Y., assignor to Eastman Kodak Company, Rochester, N.Y., a corporation of New Jersey
No Drawing. Filed June 11, 1959, Ser. No. 819,577
6 Claims. (Cl. 260—226)

This invention relates to a process for preparing dicarboxylic acid esters of ethyl cellulose of photographic quality from commercial grade ethyl cellulose in which hydroxyl amine or hydrazine is employed in the esterification bath.

Dicarboxylic acid esters of ethyl cellulose, particularly ethyl cellulose phthalate, whose ammonium or sodium salts are water soluble have been recognized as useful as the vehicle for light-sensitive silver salts in the making of photographic emulsions as shown by U.S. Patent No. 2,725,293 of Talbot and McCleary. However, it is desirable that the vehicles for light-sensitive silver salts be substantially free from those reducing substances which affect the light-sensitive silver halide in a manner similar to exposure to light resulting in products of inferior quality. The use of commercial grades of ethyl cellulose as the starting material in methods of preparing those esters, such as described in U.S. Patents Nos. 2,759,925 of Hiatt, Mench and Emerson, and 2,753,339 of Malm and Crane has introduced reducing substances; hence, for esters for photographic use the ethyl cellulose has been specially prepared. The reducing substances found in commercial grades of ethyl cellulose may have been either the result of the method used to manufacture the ethyl cellulose, the result of formation of reducing substances upon storage of the ethyl cellulose or the result of some chemical treatment of the ethyl cellulose such as in the use of an inorganic acid thereon.

One object of my invention is to provide a method for preparing dicarboxylic acid esters of ethyl cellulose using ethyl cellulose of commercial grade as the starting material. Another object of my invention is to provide a method of preparing dicarboxylic acid esters of commerical grade ethyl celluloses of good photographic quality. A further object of my invention is to provide a process for the phthalation (dicarboxylation) of ethyl cellulose in which hydroxyl amine or hydrazine is employed in the esterification bath. Other objects of my invention will appear herein.

The presence of substantial amounts of reducing substances in a mtaerial is shown by copper number. For photographic uses it is desirable that the materials have a copper number of not more than 0.3 and preferably even not more than 0.2. However, in the preparation of ethyl cellulose phthalates from commercial grade ethyl cellulose, products of somewhat higher copper numbers are customarily obtained. For instance, using a standard commercial grade ethyl cellulose in a procedure in which the ethyl cellulose is phthalated with phthalic anhydride and sodium acetate catalyst, products having a copper number of 0.47 or more frequently result. In cases where a lowered viscosity has been imparted to the ethyl cellulose, such as by treatment with sulfuric acid, as by the method described in U.S. Patent No. 2,753,339 of Malm and Crane, especially undesirable copper numbers result giving products not adapted to many photographic purposes. Copper number is determined by the method described in Bureau of Standards Research Paper 295, vol. 6, April 1931.

In its broadest aspects my invention comprises incorporating in the esterification bath in a method for preparing a dicarboxylic acid ester of ethyl cellulose in which commercial grade ethyl cellulose (containing free and esterifiable hydroxyl) is reacted upon with a dicarboxylic anhydride and a basic catalyst, an amount of hydroxyl amine or hydrazine within the range of 0.1–10% and preferably within the range of 2–5%, based on the weight of ethyl cellulose used. Although my invention is adapted for use in the preparation of dicarboxylic acid esters generally including succinates, maleates or the like, it is particularly useful in the preparation of the phthalates which have been of greatest interest up to now and, hence, will be described more specifically with reference to the preparation of the ethyl cellulose phthalates. In the preparation of ethyl cellulose phthalate the ethyl cellulose in solution is reacted upon with phthalic anhydride and a basic catalyst such as sodium acetate usually in the presence of a solvent such as acetic acid. In accordance with my invention, hydroxylamine or hydrazine is incorporated in the esterification mass and the reaction is carried out in their presence. In the making of ethyl cellulose phthalate for photographic purposes it has often been desirable to lower the viscosity of the ethyl cellulose prior to its phthalation such as by first treating it with a solution of sulfuric acid in acetic acid for the desired time. The resulting ethyl cellulose of lowered viscosity is then esterified with phthalic anhydride and a catalyst (a salt which has basic characteristics in acetic acid solution). In accordance with my invention, hydroxyl amine or hydrazine is also incorporated in the esterification bath. The following examples illustrate my invention.

*Example 1*

812 parts of commercial grade ethyl cellulose having a moisture content of 1.4%, an ethoxyl content of 46.5%, viscosity in toluene-alcohol (4:1) at 25° C. of 87 cps. and a copper number of 0.40 were mixed in a jacketed sigma bladed stainless steel mixer with 1013 parts acetic acid and 16 parts hydroxylamine sulfate. The mass was stirred at 100° F. until a clear solution was obtained. There was then added to the mixer a mixture of 12.6 parts of 95% sulfuric acid and 25 parts of acetic acid and the mass was stirred. The treatment was continued until a viscosity of 54 seconds was obtained. This viscosity was determined by diluting a sample of the material with an equal weight of acetic acid and measuring the time required for a 1/8 inch steel ball to drop through 10 cm. of the solution at 25° C. in a 1/2 inch diameter glass tube.

When this viscosity had been attained, 23 parts of 85% magnesium carbonate was added to the solution and stirring was continued for 10 minutes. There was then stirred in 70 parts of 97% acetic anhydride followed by 890 parts of sodium acetate and 800 parts of phthalic anhydride. The temperature was raised to 180° F. and the reaction run for 6 hours. Then 3000 parts of distilled water was slowly added to the mixer and the mass was stirred and cooled until a finely divided precipitate was obtained. The product was washed in successive changes of distilled water until substantially free from uncombined acids and was dried at 100° F. The product had a copper number of 0.05. Its apparent phthalyl was 21.6% and its viscosity at 3% solution in ethyl alcohol-isopropanol-N-butyl alcohol (7:2:1) at 25° C. was 4 cps. The material thus prepared was found to be of value as the carrier for silver halide in photographic emulsions and had no desenitizing or fogging effect thereon when in contact therewith for considerable periods of time.

*Example 2*

8.1 parts of ethyl cellulose of approximately 45% ethoxyl content, 9.6 parts of acetic acid and 0.16 part hydrazine sulfate were loaded in a jacketed sigma bladed mixer and the mass was stirred for 15 minutes to a temperature of 122° F. A mixture consisting of 0.033 part, 95.8% sulfuric acid, 0.1 part acetic acid was added to the mixer and the temperature maintained until the time that a sample when removed from the mixer, and 20 parts thereof are mixed with 20 parts of glacial acetic acid to form a uniform solution and the mixture is cooled to 25° C. gives a viscosity of 115 seconds when measured by the ⅛ diameter steel ball when passed through 10 centimeters of solution.

0.135 part of 85% magnesium carbonate were added to the mixer and the mass was stirred for 1 or 2 minutes. 0.75 part acetic anhydride (97%) were added to the mixer and the solution was stirred for 15 minutes. 8 parts sodium acetate together with 8 parts of phthalic anhydride were then added to the mixer and the reaction temperature was raised to 190° F. and maintained 6 hours. At the end of this time 34 parts of 36° F. distilled water were slowly added to the reaction solution and the jacket temperature maintained at 50° F. After a period of 1 hour the finely divided precipitate was passed through a comminuter, washed in warm distilled water until substantially free from acids, slurried in warm distilled water and treated with 0.165 part oxalic acid, dissolved in warm distilled water, followed by stirring in ⅒ part 95% sulfuric acid, dissolved in warm distilled water for 30 minutes. The slurry was then held for 3 hours, drained and washed in successive changes of distilled water until a test for effluent showed substantial freedom from sulfate. The product was dried at 100° F. It analyzed as follows:

Apparent phthalyl_____percent__ 23½
Free phthalic acid_____do____ 0
Viscosity at 3% concentration in 3A alcohol-isopropanol-N-butanol (70:20:10) at 25° C__cps__ 5.3
Copper number_____ 0.17

I claim:
1. In the making of dicarboxylic acid esters of ethyl cellulose in which ethyl cellulose containing free and esterifiable hydroxyl groups is treated with sulfuric acid and subsequently esterified with dicarboxylic acid anhydride and a basic catalyst the step which comprises mixing the ethyl cellulose with 0.1–10%, based on the weight of the ethyl cellulose, of a compound selected from the group consisting of hydroxyl amine, hydrazine and their salts whereby a product is obtained having a copper number of no more than 0.3.

2. In the making of ethyl cellulose phthalate in which ethyl cellulose containing free and esterifiable hydroxyl groups is treated with sulfuric acid and subsequently esterified with phthalic anhydride and a basic catalyst the step which comprises mixing the ethyl cellulose with 0.1–10%, based on the weight of the ethyl cellulose, of a compound selected from the group consisting of hydroxyl amine, hydrazine and their salts whereby a product is obtained having a copper number of no more than 0.3.

3. In the making of dicarboxylic acid esters of ethyl cellulose in which ethyl cellulose containing free and esterifiable hydroxyl groups is treated with sulfuric acid and subsequently esterified with dicarboxylic acid anhydride and a basic catalyst the step which comprises mixing the ethyl cellulose with 2–5%, based on the weight of the ethyl cellulose, of a compound selected from the group consisting of hydroxyl amine, hydrazine and their salts whereby a product is obtained having a copper number of no more than 0.3.

4. In the making of dicarboxylic acid esters of ethyl cellulose in which ethyl cellulose containing free and esterifiable hydroxyl groups is treated with sulfuric acid and esterified with dicarboxylic acid anhydride and a basic catalyst the step which comprises mixing the ethyl cellulose with 0.1–10%, based on the weight of the ethyl cellulose, of hydroxyl amine.

5. In the making of dicarboxylic acid esters of ethyl cellulose in which ethyl cellulose containing free and esterifiable hydroxyl groups is treated with sulfuric acid and esterified with dicarboxylic acid anhydride and a basic catalyst the step which comprises mixing the ethyl cellulose with 0.1–10%, based on the weight of the ethyl cellulose, of hydrazine.

6. In the making of dicarboxylic acid esters of ethyl cellulose in which ethyl cellulose containing free and esterifiable hydroxyl groups is treated with sulfuric acid and subsequently esterified with dicarboxylic acid anhydride and sodium acetate the step which comprises mixing the ethyl cellulose with 0.1–10%, based on the weight of the ethyl cellulose, of a compound selected from the group consisting of hydroxyl amine, hydrazine and their salts whereby a product is obtained having a copper number of no more than 0.3.

References Cited in the file of this patent

UNITED STATES PATENTS 2,069,974    Schulze _____ Feb. 9, 1937
2,093,462    Malm et al. _____ Sept. 21, 1937